United States Patent [19]

Dunklin et al.

[11] 4,358,488

[45] Nov. 9, 1982

[54] SIMULATED VEHICLE LOUVRE APPLIQUE

[75] Inventors: Hubbard L. Dunklin, Anaheim, Calif.; Larry E. Reeves, 5922 Hadrians Crescent, Anaheim, Calif. 92807

[73] Assignee: Larry Eugene Reeves, Anaheim, Calif.

[21] Appl. No.: 223,761

[22] Filed: Jan. 9, 1981

[51] Int. Cl.³ .............................................. G02B 27/00
[52] U.S. Cl. ........................................ 428/31; 40/593; 160/DIG. 7; 160/368 S; 296/97 R; 350/276 R; 428/79; 428/137; 428/187
[58] Field of Search ................. 40/591, 593; 160/368, 160/354, DIG. 7; 296/97 R; 350/276 R; 428/31, 79, 137, 187

[56] References Cited

U.S. PATENT DOCUMENTS

| 757,549 | 4/1904 | Gould | 428/181 X |
|---|---|---|---|
| 2,143,382 | 1/1939 | Martens | 160/264 |
| 3,681,180 | 8/1972 | Kent | 428/31 X |
| 3,975,849 | 8/1976 | Tuleja | 40/591 X |
| 4,261,649 | 4/1981 | Richard | 350/276 R |

*Primary Examiner*—Henry F. Epstein
*Attorney, Agent, or Firm*—Kit M. Stetina

[57] ABSTRACT

A low cost sun screen device for use on motor vehicles is disclosed comprising a perforated polymer laminate sheet which is affixed to the interior surface of the vehicle rear window. The outermost surface of the laminate sheet includes artwork and other indicia formed thereon which when viewed by an observer through the rear window of the vehicle, simulates the appearance of a three-dimensional mechanical window louvre structure. The perforated laminate sheet provides an aesthetically pleasing, effective sunshield which reduces the temperature of the interior compartment of the vehicle by as much as forty percent while insuring that occupant visibility is not adversely affected.

15 Claims, 5 Drawing Figures

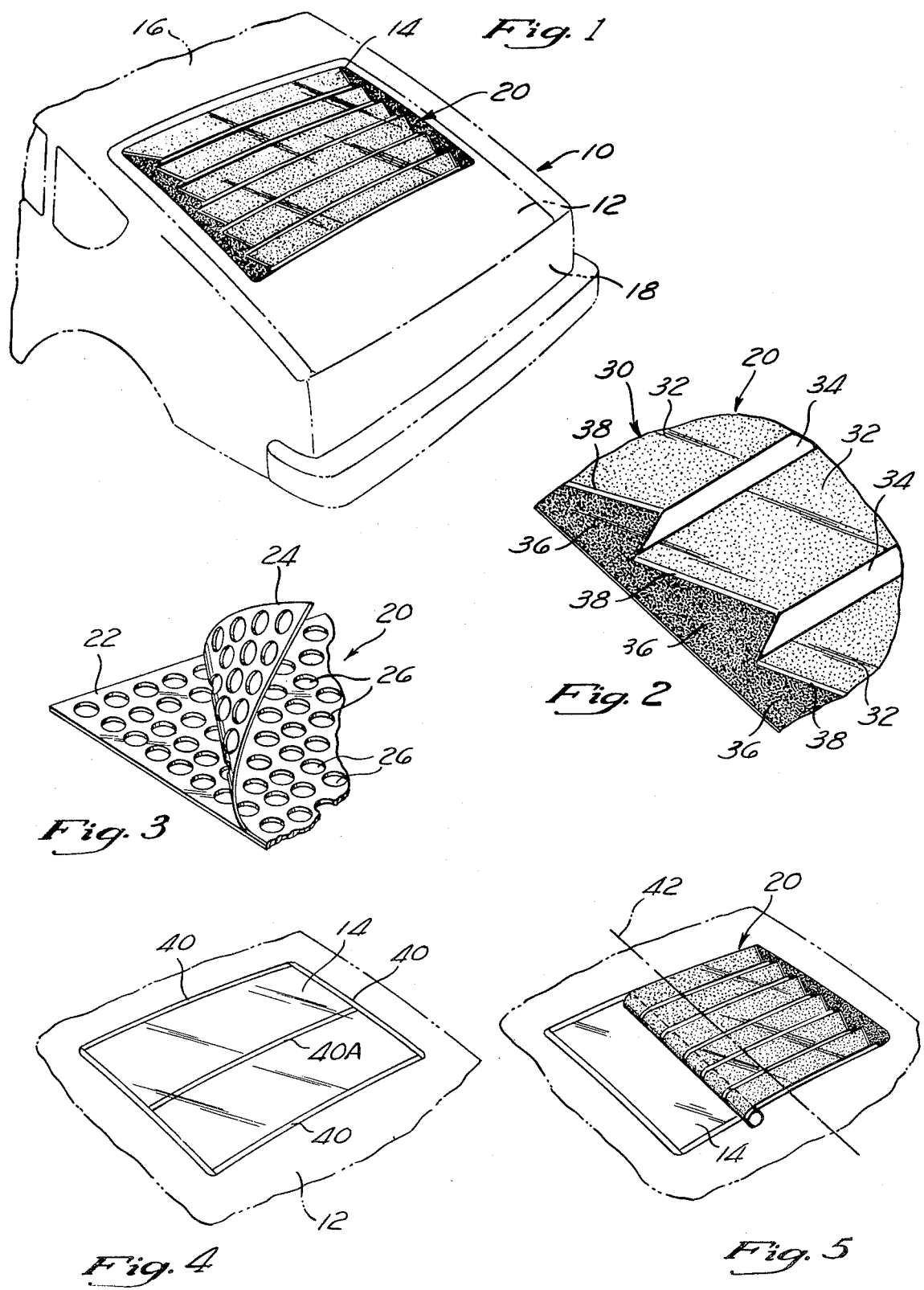

SIMULATED VEHICLE LOUVRE APPLIQUE

BACKGROUND OF THE PRESENT INVENTION

The present invention relates to devices utilized on motor vehicles for reducing the effects of incident sunlight, and more particularly, to a sun screen applique which simulates the aesthetic appearance of a three-dimensional mechanical window louvre structure.

In recent years, the automotive industry has manufactured a variety of passenger vehicles which include a hatchback or liftback panel extending in an angular orientation between the roof panel and rear end of the vehicle. To insure that occupant visibility from within the vehicle is not impaired, the majority if not all of these hatchback panels are provided with a relatively large area rear window which typically extends substantially throughout the length and width of the hatchback panel. Although providing increased occupant visibility, the large windows of the hatchback panels significantly increase the transmittance of incident sunlight within the interior compartment of the vehicle which causes an attendant increase in the temperature of the interior compartment and typically promotes fading of the coach work upholstery materials.

In recognizing these adverse temperature and fading deficiencies associated with the large window design of the hatchback panels, the prior art has heretofore provided mechanical window louvre structures which are installed upon the vehicle to cover the exterior surface of the window. As is well known, these mechanical louvre structures are formed of a plurality of vertically spaced shutter panels which are laterally offset or overlapped with respect to one another, and formed of an anodized or coated aluminum material to yield a sporty aesthetic appearance. Due to the vertical spacing or voids formed between the individual shutter panels of the device, occupant visibility in a direction substantially parallel to the plane of the louvres is provided while incident sunlight in a direction generally perpendicular to the plane of the louvres is screened from the interior of the vehicle. Although such prior art mechanical louvre devices have proven useful and aesthetically pleasing in their general application, there are inherent deficiencies associated in their specific use.

Foremost of these deficiencies is the relative high cost of such mechanical louvre structures which typically ranges between one hundred and fifty to two hundred dollars per unit. Further, in view of the prior art louvre structures being typically mechanically mounted to the exterior body of the vehicle, installation charges often exceed the initial capital cost of the device and hence, render the device financially unacceptable to a vast majority of the public.

In addition to their high cost, the mechanical louvre structures often reduce lateral visibility of the occupants within the vehicles to an extent which poses a significant safety hazard during operation of the vehicle. These safety hazards have prompted the Federal as well as State legislators to promote minimum visibility, transmittance, and reflectance standards for louvre/sun screen devices which in many instances have curtailed or prevented their continued use on motor vehicles.

Further, due to their mechanical mounting upon the exterior of the vehicle, the prior art mechanical louvre structures are subject to environmental corrosion, susceptible to theft, as well as pose difficulties in permitting the cleaning of the rear window of the vehicle. Hence, there exists a substantial need in the art for a vehicular window sun screening device which although maintains the aesthetic value of the prior art mechanical window louvre structures, is relatively inexpensive to purchase and install, does not impair occupant visibility, and may be effectively utilized throughout prolonged duration without being subject to corrosion or theft.

SUMMARY OF THE PRESENT INVENTION

The present invention specifically addresses and alleviates the above referenced deficiencies associated with the use of mechanical window louvre structures of the prior art. More particularly, the present invention comprises a sun screen applique for use on motor vehicles which is formed of a perforated polymer laminate sheet and which is affixed to the interior surface of the rear window of the vehicle. The outermost surface of the laminate sheet includes artwork or indicia formed thereon which when viewed through the rear window of a vehicle by an observer located exterior of the vehicle, simulates the appearance of a three-dimensional mechanical window louvre structure. Due to the perforation of the simulated louvre applique of the present invention, the visibility of occupants within the vehicle is not impaired while incident sunlight is reflected by the polymer laminate sheet and screened from the interior of the vehicle. In the preferred embodiment, the simulated vehicle louvre applique may be manufactured at a retail cost of approximately thirty dollars and may be easily applied or installed on the rear window of the vehicle by the consumer. Hence, the simulated vehicle louvre applique of the present invention comprises an extremely low cost vehicular sun screening device which maintains the pleasing aesthetics of the prior art mechanical window louvre devices while insuring unimpaired occupant visibility from the interior of the vehicle.

In addition to the improved cost, installation and visibility features, the present invention due to its mounting on the interior surface of the rear window of the vehicle, further eliminates the corrosion and theft deficiencies heretofore associated in the art. Further, cleaning of the exterior surface of the rear window is unobstructed by use of the present invention while the interior surface of the vehicle louvre applique may be readily cleaned with conventional cleaning fluids without damage. Additionally, the simulated vehicle louvre applique of the present invention eliminates anylight distortion when viewing outward from the interior of the vehicle and reduces interior compartment temperatures within the vehicle by as much as forty percent.

DESCRIPTION OF THE DRAWINGS

These as well as other features of the present invention will become more apparent upon reference to the drawings wherein;

FIG. 1 is a perspective view of a passenger motor vehicle including the simulated vehicle louvre applique affixed to the rear window thereof;

FIG. 2 is an enlarged fragmentary view of the outermost surface of the simulated vehicle louvre applique of the present invention illustrating the particular artwork indicia formed thereon;

FIG. 3 is an enlarged perspective view of a portion of the simulated vehicle louvre applique of the present invention depicting its perforated polymer laminate sheet construction;

FIG. 4 is a perspective view of the rear window of the vehicle of FIG. 1 illustrating the manner in which transfer tape is positioned on the window prior to applying the simulated vehicle louvre applique of the present invention; and FIG. 5 is a perspective view of the rear window of the vehicle in FIG. 1 illustrating the manner in which the simulated vehicle louvre applique of the present invention is installed upon the interior surface of the window.

DETAILED DESCRIPTION OF THE PREFERRED EMBODIMENT

Referring to FIG. 1, there is shown a passenger vehicle 10 (indicated in phantom lines) having a hatchback panel 12 and including a rear window 14. As is well known, the hatchback panel 12 is preferably hinged mounted to the rear portion 16 of the vehicle 10 and extends in an angular orientation toward the rear end 18 of the vehicle 10. The simulated vehicle louvre applique 20 of the present invention (designated generally by the numeral 20) is affixed to the interior surface of the rear window 14 (in a manner to be described infra) and when viewed from the exterior of the vehicle 10 and through the rear window 14, simulates the appearance of the prior art three-dimension mechanical window louvre structure.

Referring particularly to FIGS. 2 and 3, the detailed construction of the simulated vehicle louvre applique 20 of the present invention may be described. The applique 20 is formed of a pair of flexible polymer sheets 22 and 24 which are laminated together resulting in a contiguous sheet structure. The lowermost sheet 22 (which is exposed to the interior compartment of the vehicle 10 when the applique 20 is affixed to the rear window 14) is preferably formed of a 12 gauge poly-vinyl chloride (PVC) sheet material while the uppermost sheet 24 (which contacts the interior surface of the rear window 14 when the applique 20 is installed on the vehicle) is preferably formed of a one-half gauge silver colored polyester fabric sheet. When laminated together, the uppermost polyester sheet 24 lends dimensional stability to the lower PVC sheet 22 thereby preventing the applique 20 from being deformably stretched during its installation onto the window 14.

As shown, the laminate sheets 22 and 24 are perforated by a plurality of apertures 26 which may be formed in varying sizes but in the preferred embodiment, are approximately 1/32 of an inch in diameter and equidistantly spaced throughout the entire planar surface area of the applique 20. Due to the apertures 26 forming a plurality of voids through the sheets 22 and 24, when installed upon the windshield 14, an occupant (not shown) disposed within the interior compartment of the vehicle 10, may see or view through the plural apertures 26 and hence, through the applique 20 without distortion or impaired vision. Further, due to the upper sheet 24 being formed of a silver polyester material, the vast majority of incident sunlight falling upon the applique 20 is reflected and/or dissipated into the environment and thus, prevented from entering into the interior compartment of the vehicle.

The outermost surface of the sheet 24 is provided with suitable artwork or indicia (designated generally by the numeral 30 in FIG. 2) which is specifically designed to simulate the three-dimensional appearance of the prior art mechanical window louvre structure. The artwork or indicia 30 is preferably formed on the outermost sheet 24 of the applique 20 by a silk-screening or half-tone printing process. In the preferred embodiment a three-color silk-screening process (i.e., black, dark grey, and light grey) is utilized to form the indicia 30 and yield a close simulation of the appearance of a three-dimensional louvre structure.

As best shown in FIG. 2, the indicia 30 includes a shutter portion 32, void portion 34 and side portion 36 each of which includes a configuration and shading which provides a composite louvre-like appearance to the indicia 30. The shutter portion 32 is preferably formed in a light grey shading color with the void portion 34 disposed between the plural shutter portions being formed in a jet black color. The side portions 36 are formed in a dark grey shading color such that a depth perception is yielded on the indicia 30. To highlight the transition between the shutter portions 32 and side portions 36, the silver polyester sheet 24 is allowed to show through (i.e., no color is applied during the silk screening process) such that a silver line corner transition 38 is provided. Although variations to the color of the portions 32 through 36 may be utilized, the applicant has found that superior sun screening results are yielded when the black, dark grey, and light grey silk screening colors are utilized which additionally provides an extremely close simulation of the existing prior art mechanical window louvre structures.

The installation of the simulated vehicle louvre applique 20 of the present invention may be described with particular reference to FIGS. 4 and 5. The initial step in the installation of the applique 20 is the deposition of transfer tape 40 to the perimeter area of the rear window 14. Such transfer tape is well known in the art and provides a relatively thin, transparent film which includes a suitable adhesive on both sides thereof such that once deposited upon the window 14, the transfer tape adheres thereto while providing on its opposite side, an additional adhesive bearing surface. An example of a suitable transfer tape is 927Y transfer tape manufactured by the Minnesota Mining and Manufacturing Company, however equivalent tapes may be readily utilized. In addition to the perimeter transfer tape 40, an additional strip of transfer tape 40A is preferably applied either to the center portion of the rear window 40 to extend laterally there across, or alternatively is applied to the outermost surface of the simulated louvre applique 20. In the preferred embodiment, this additional strip 40A is positioned on the rear window 14 or applique 20 in a location to coincide with one of the void portions 34 of the indicia 30 formed on the applique 20 such that the transfer tape 40A is not visually apparent when the applique 20 is installed on the window.

With the transfer tape 40 and 40A applied to the rear window 14, the installer (not shown) must locate the center line 42 (as shown in FIG. 5) of the rear window 14 and mark the same adjacent the perimeter surface of the window 14. The simulated louvre applique 20 of the present invention is advantageously provided with a pair of center alignment marks (not shown) along its border portion which during installation are aligned with the center line 42 of the rear window 14. Registered with the center line of the rear window 14 in such manner, the applique 20 is subsequently applied to the interior surface of the rear window 14 from the center portion outward, with the applique 20 being maintained against the window 14 by contact with the transfer tape 40A. As will be recognized, due to the additional strip 40A of transfer tape extending laterally across the window 14, as the applique 20 is applied thereto, the applique 20 conforms to any curvature of the rear window 14 and thereby is maintained in a contiguous orientation with the window 14. The applique 20 is continued to be applied to the window 14 from the center portion outward until the perimeter of the applique is juxtaposed on the perimeter transfer tape 40. Typically, the applique 20 includes a border portion (not shown) which extends slightly outward beyond the perimeter edges of the window 14 which permits the installer to grasp the same and press the perimeter portion of the applique 20 against the transfer tape 40. Once the applique 20 is affixed to the window 14 in such a manner, the excess border portion (not shown) of the applique 20 is trimmed as by way of a razor blade, and thus the applique is precisely sized to the interior surface of the rear window 14. When installed upon the window 14, the applique 20 renders a visual image simulating an exterior mounted three-dimensional mechanical louvre structure (as depicted in FIG. 1) when in reality the applique is a thin sheet affixed to the interior surface of the window 14.

In summary, the present invention provides a significant improvement in the vehicular sun screening art by providing a relatively low-cost device which effectively screens or filters incident sunlight from the interior compartment of a motor vehicle without adversely affecting occupant visibility. In addition, the device by use of indicia 30 formed on its exterior surface provides an aesthetically pleasing appearance which simulates a three-dimensional mechanical window louvre structure. Further, due to the applique 20 of the present invention being positioned upon the interior surface of the rear window 14, theft of the device from the vehicle is eliminated while cleaning of the rear window 14 of the vehicle is not impaired. Those skilled in the art will recognize that although in the preferred embodiment a particular color and configuration of the louvre indicia 30 is disclosed, variations to the configuration and/or color may be made without departing from the spirit of the present invention so long as such variations are adapted to provide suitable sun screening while maintaining the pleasing aesthetics of the device.

What is claimed is:

1. A sun screening device for use on a window of a motor vehicle comprising:
    a thin flexible sheet formed to be applied in a generally contiguous orientation to the interior surface of said vehicle window, said sheet formed of a material adapted to reflect and dissipate incident sunlight falling on said sheet;
    plural apertures formed through said sheet, said apertures sized to permit unimpaired vision through said sheet while maintaining a sufficient surface area for said sheet so that the majority of said incident sunlight falling on said sheet is screened from passage into the interior compartment of said vehicle; and
    indicia formed on said sheet adapted to generate a visual image simulating a rigid, three-dimensional window louvre structure when viewed from the exterior of said vehicle and through said window.

2. The sun screening device of claim 1 wherein said sheet comprises a polymer laminate.

3. The sun screening device of claim 2 wherein said polymer laminate comprises a first sheet portion formed of a polyvinyl chloride material and a second sheet portion formed of a polyester fabric material.

4. The sun screening device of claim 3 wherein said indicia is formed on said second sheet portion of said laminate.

5. The sun screening device of claim 4 wherein said indicia is formed by silk-screening.

6. The sun screening device of claim 4 wherein said indicia is formed by a half-tone printing.

7. The sun screening device of claim 5 wherein said silk-screening comprises a three-color silk-screening process.

8. The sun screening device of claim 4 wherein said plural apertures are equidistantly spaced along the surface of said polymer laminate.

9. The sun screening device of claim 8 wherein said plural apertures are sized to be approximately 1/32 of an inch in diameter.

10. A sun screening device for use on the rear window of a motor vehicle to reduce the temperature of the interior compartment of said motor vehicle comprising:
    a thin flexible laminate sheet comprising a first sheet portion formed of a polyvinyl chloride material and a second sheet portion formed of a polyester fabric material, said laminate sheet sized to be applied in a substantially contiguous orientation to the surface of said rear window exposed within the interior compartment of said vehicle and adapted to reduce the passage of incident sunlight falling on said rear window into said interior compartment of said vehicle;
    a plurality of apertures formed through said laminate sheet each sized to permit vision through said laminate sheet from said interior compartment of said vehicle; and
    indicia formed on said laminate sheet representing a louvre structure, said indicia, when viewed through said rear window from a location exterior of said vehicle, adapted to render a visual image simulating an exterior mounted three dimensional mechanical window louvre structure.

11. The sun screening device of claim 10 wherein said indicia comprises:
    a first indicia portion representing plural louvre shutters, which are vertically spaced and extend in a generally parallel orientation along the length of said laminate sheet;
    a second indicia portion representing a void formed between adjacent louvre shutters; and
    a third indicia portion representing a side transition between said plural louvre shutters.

12. The sun screening device of claim 11 wherein said first indicia portion is formed in a first color, said second indicia portion is formed in a second color, darker than said first color, and said third indicia portion is formed in a third color darker than said first color but lighter than said second color.

13. The sun screening device of claim 12 wherein said first color is gray, said second color is black and said third color is dark gray.

14. The sun screening device of claim 12 wherein said first, second, and third indicia portions are formed by silk-screening.

15. The sun screening device of claim 12 wherein said first, second, and third indicia portions are formed by a half-tone printing process.

* * * * *